(12) United States Patent
Okubo et al.

(10) Patent No.: US 7,803,087 B2
(45) Date of Patent: Sep. 28, 2010

(54) SYSTEM AND METHOD FOR CONTROLLING A VEHICLE

(75) Inventors: Shunsuke Okubo, Belleville, MI (US); Matthew Smith, Dearborn Heights, MI (US); Benjamin Thorsen, Berkley, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 687 days.

(21) Appl. No.: 11/550,016

(22) Filed: Oct. 17, 2006

(65) Prior Publication Data

US 2008/0090696 A1   Apr. 17, 2008

(51) Int. Cl.
B60W 10/08 (2006.01)

(52) U.S. Cl. .......................................... 477/4; 477/107

(58) Field of Classification Search ............ 477/3, 477/4, 107, 111; 180/65.2, 65.4; 701/48, 701/51, 53, 64; 903/909, 945
See application file for complete search history.

(56) References Cited

U.S. PATENT DOCUMENTS

| | | | | |
|---|---|---|---|---|
| 4,691,285 A | * | 9/1987 | Takeda | 701/99 |
| 4,744,031 A | * | 5/1988 | Takeda et al. | 701/66 |
| 5,072,390 A | * | 12/1991 | Lentz et al. | 701/60 |
| 5,696,680 A | | 12/1997 | Ichioka et al. | |
| 5,757,153 A | | 5/1998 | Ito et al. | |
| 5,759,131 A | * | 6/1998 | Kosik et al. | 477/84 |
| 5,771,478 A | | 6/1998 | Tsukamoto et al. | |
| 5,887,670 A | | 3/1999 | Tabata et al. | |
| 5,991,678 A | * | 11/1999 | Gil | 701/51 |
| 6,283,891 B1 | * | 9/2001 | Wozniak et al. | 477/94 |
| 6,334,498 B1 | | 1/2002 | Morisawa et al. | |
| 6,976,935 B2 | * | 12/2005 | Boll et al. | 477/77 |
| 2002/0189397 A1 | | 12/2002 | Sakamoto et al. | |
| 2003/0114271 A1 | * | 6/2003 | Inoue et al. | 477/117 |
| 2004/0014562 A1 | * | 1/2004 | Kresse et al. | 477/107 |
| 2004/0072650 A1 | * | 4/2004 | Matsumura et al. | 477/181 |
| 2005/0233856 A1 | * | 10/2005 | Endo | 477/93 |
| 2006/0016412 A1 | * | 1/2006 | Butcher et al. | 123/179.3 |
| 2007/0256871 A1 | * | 11/2007 | Kaneko et al. | 180/65.2 |
| 2008/0009391 A1 | * | 1/2008 | Scelers | 477/107 |

FOREIGN PATENT DOCUMENTS

JP        2006105288 A   *   4/2006

* cited by examiner

*Primary Examiner*—Roger L Pang
*Assistant Examiner*—Justin Holmes
(74) *Attorney, Agent, or Firm*—David B. Kelley; Brooks Kushman P.C.

(57) ABSTRACT

The embodiments described herein include a control system and method for a vehicle. In one embodiment, the control system is able to determine the occurrence of NVH anomalies due to gear lash and control the operation of various vehicle devices to reduce the effects of gear lash. If such NVH anomalies are foreseen, a predetermined torque is applied to the vehicle wheels for a predetermined time period. Subsequently, the applied torque is gradually increased until a creep torque is reached.

20 Claims, 3 Drawing Sheets

_US 7,803,087 B2_

SYSTEM AND METHOD FOR CONTROLLING A VEHICLE

TECHNICAL FIELD

The embodiments described herein relate to a system and method for controlling a vehicle.

BACKGROUND

A vehicle typically has at least four shift positions commonly referred to as "gears." As commonly known, the vehicle operator modulates a shifter to select the shift positions including a DRIVE shift position, a REVERSE shift position, a NEUTRAL position, and a PARK position. The vehicle operator selects the DRIVE shift position to enable the vehicle to travel forward or the REVERSE shift position to enable to vehicle to travel in reverse. The ability for the vehicle to travel forward and backward occurs through the use of a powertrain on the vehicle. The powertrain typically includes a vehicle engine, and in some cases electric motors/generators that are coupled to a transmission.

The transmission has a number of gear sets with gear teeth that are engaged when the vehicle operator selects a particular shift position. Typically, there is a gear lash between the gear teeth. As such, in some cases, when the operator shifts from the DRIVE shift position to the REVERSE shift position or the REVERSE shift position to the DRIVE shift position, the meshing gear teeth, due to the gear lash, cause noise, vibration, and harshness (NVH) concerns as the gear teeth strike each other. Ultimately, this can result in an objectionable "clunking" sound and tactile disturbances. Conventional vehicle control systems do not optimally control the vehicle powertrain to avoid problems resulting from the gear lash.

The embodiments described herein were conceived in view of these and other disadvantages of conventional vehicle control systems.

SUMMARY

The embodiments described herein include a control system and method for a vehicle. In one embodiment, the vehicle includes at least one gear set being configured to transition between at least a first shift position and a second shift position. The control system includes a controller being operable with the gear set. The controller determines whether the gear set is transitioning between the first shift position and the second shift position and generates signals for an application of a predetermined torque to the gear set. The application of the predetermined torque occurs for a predetermined time period in response to the transition between the first shift position and the second shift position. In one embodiment, the first shift position is a reverse shift position while the second shift position is a drive shift position.

The method for controlling a vehicle includes determining whether the shift position set is transitioning between the first shift position and the second shift position through the use of the controller. The method further includes generating signals for an application of a predetermined torque to the gear set for a predetermined time period in response to the transition between the first shift position and the second shift position.

BRIEF DESCRIPTION OF THE DRAWINGS

The features of the embodiments described herein are set forth with particularity in the appended claims. The present invention, both as to its organization and manner of operation, together with further advantages thereof, may be best understood with reference to the following description, taken in connection with the accompanying drawings in which:

DETAILED DESCRIPTION OF THE PREFERRED EMBODIMENT(S)

As required, detailed embodiments of the present invention are disclosed herein. However, it is to be understood that the disclosed embodiments are merely exemplary of the invention that may be embodied in various and alternative forms. The figures are not necessarily to scale, and some features may be exaggerated or minimized to show details of particular components. Therefore, specific functional details disclosed herein are not to be interpreted as limiting, but merely as a representative basis for the claims and/or as a representative basis for teaching one skilled in the art to variously employ in the present invention.

Figure 1:
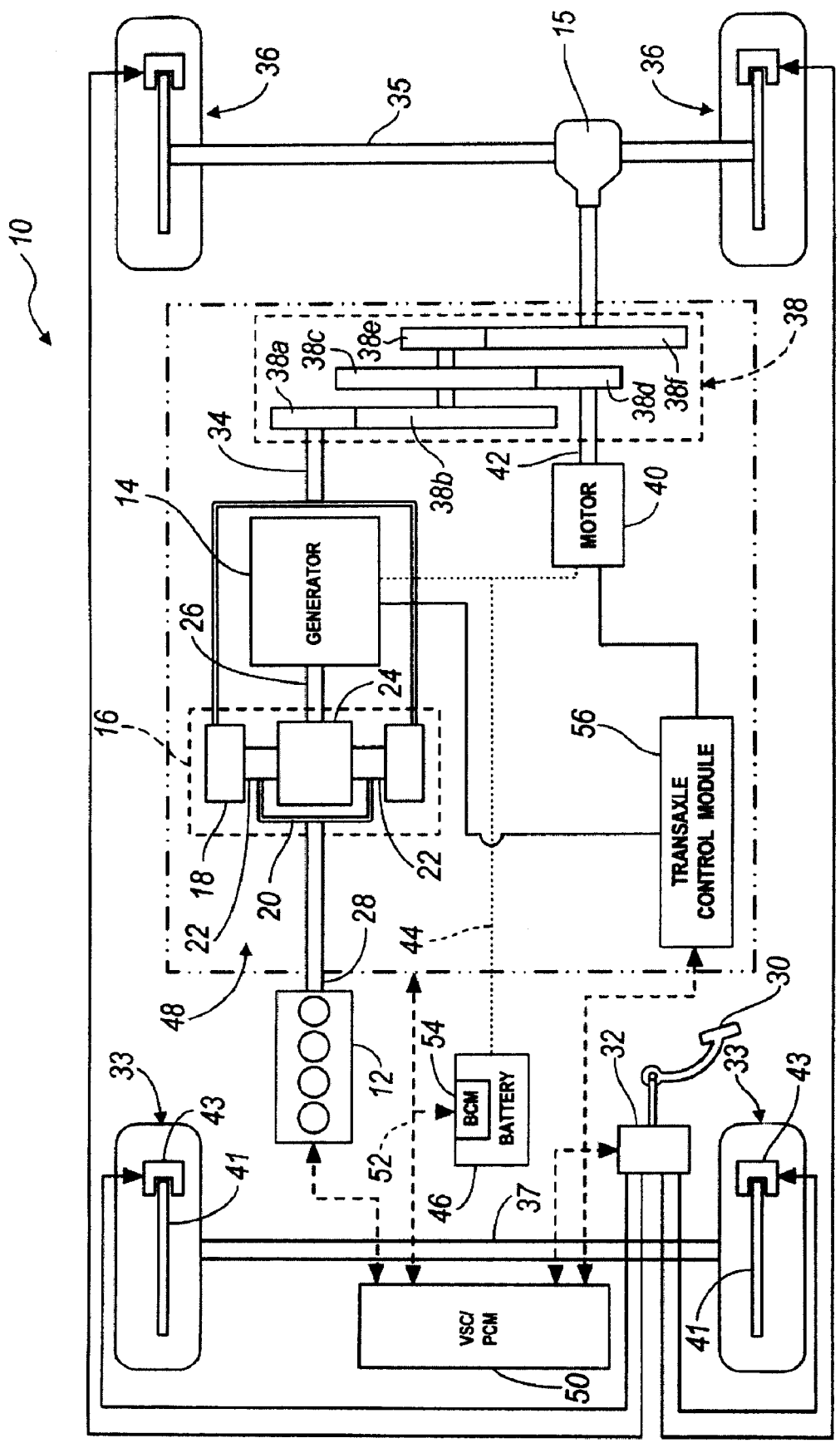
FIG. 1 is a schematic representation of an exemplary vehicle in accordance with an embodiment of the present invention.

FIG. 1 illustrates a schematic representation of a vehicle 10 in accordance with one embodiment of the present invention. The vehicle 10 includes an engine 12 and an electric machine, or generator 14. The engine 12 and the generator 14 are connected through a power transfer unit, which in this embodiment is a planetary gear set 16. Of course, other types of power transfer units, including other gear sets and transmissions, may be used to connect the engine 12 to the generator 14. The planetary gear set includes a ring gear 18, a carrier 20, planet gears 22, and a sun gear 24.

The generator 14 can also be used as a motor, outputting torque to a shaft 26 connected to the sun gear 24. Similarly, the engine 12 outputs torque to a shaft 28 connected to the carrier 20. In one embodiment, the shaft 28 is comprised of two separate shafts that are coupled together by a damper (not shown). Having the generator 14 operatively connected to the engine 12, as shown in FIG. 1, allows the speed of the engine 12 to be controlled by the generator 14.

The ring gear 18 is connected to a shaft 34, which is connected to vehicle drive wheels 36 (i.e., rear wheels) through a second gear set 38. The gear set 38 includes a plurality of gears 38a, 38b, 38c, 38d, 38e, and 38f. Gears 38a-38f enable the transfer of torque from engine 12, generator 14, and a motor 40 to a differential 15 and ultimately to wheels 36. As recognized by one of ordinary skill in the art, the differential 15 includes a plurality of gears that enable the transfer of torque to wheels 36. As such, gear set 38 is mechanically coupled to a rear axle 35 through the use of the differential 15. The rear axle 35 may be comprised of several half-shafts and include several constant velocity (CV) joints. Additionally, a front axle 37 is mechanically connected to a set of front wheels 33 located on vehicle 10.

As shown in FIG. 1, the motor 40, the generator 14, the gear set 16, and a portion of the gear set 38 may generally be referred to as a transaxle 48. The transaxle 48 is analogous to a transmission in a conventional vehicle. Thus, when a driver selects a particular shift position, the transaxle 48 is appropriately controlled to provide the corresponding gear. To control the engine 12 and the components of the transaxle 48—e.g., the generator 14 and motor 40—a control system, including a controller 50, is provided.

As described above, the transaxle 48 is configured to provide gears that correspond to selected shift positions. Upon the selection of a DRIVE or REVERSE shift position, the engine 12, the generator 14, and/or the motor 40, generate a torque that is applied to the wheels 36 in the direction of the corresponding gear. For example, if the DRIVE shift position is selected, the torque will be applied to the wheels in the forward direction. If the REVERSE shift position is selected, the torque will be applied to the wheels in the opposite (or reverse) direction.

With conventional systems, when a vehicle's transmission transitions from one shift position to another (i.e., REVERSE shift position to DRIVE shift position or DRIVE shift position to REVERSE shift position), the effects of gear lash are detectable. The clunking sound that results from gear lash is the result of teeth on mating gears striking each other. For example, when a shift position transition occurs, the gear set of existing systems including the transmission, the differential, and the CV joints (collectively referred to as a "driveline devices"), experience an abrupt change in the direction of their rotation. This abrupt change is due, in part, to a virtually instantaneous change in the direction of an applied creep torque. As commonly known, the creep torque is a relatively small amount of wheel torque applied in the direction of a selected shift position that provides a vehicle mobility without engagement of the vehicle accelerator pedal. Conventionally, the applied creep torque is about 450 Newton-meters (Nm). It is recognized that the applied creep torque may nonetheless vary in accordance with a vehicle's weight.

Accordingly, upon the shift position transition, as a result of the abrupt change in creep torque, the gear teeth located on the driveline devices contact each other causing objectionable "clunking" sounds and tactile disturbances. Unlike these conventional systems, the teachings of the embodiments herein provide a system and a method that reduces the effects of gear lash, thereby reducing the undesirable noise, vibration, and harshness (NVH) anomalies.

As described above, vehicle 10 also includes a second electric machine, or motor 40, which can be used to output torque to a shaft 42. Other vehicles within the scope of the present invention may have different electric machine arrangements, such as more than or fewer electric machines. In the embodiment shown in FIG. 1, the motor 40 and the generator 14 which constitute, in part, a regenerative braking system can both be used as motors to output torque. Furthermore, motor 40 and generator 14 can each output electrical power to a high voltage bus 44 and to an energy storage device, or battery 46.

The battery 46 may be a high voltage battery that is capable of outputting electrical power to operate the motor 40 and the generator 14. Other types of energy storage devices and/or output devices can be used with a vehicle, such as the vehicle 10. For example, a device such as a capacitor can be used, which, like a high voltage battery, is capable of both storing and outputting electrical energy. Alternatively, a device such as a fuel cell may be used in conjunction with a battery and/or capacitor to provide electrical power for the vehicle 10.

It is recognized that although the vehicle 10 is an HEV, it is understood that the present invention contemplates the use of other types of vehicles. In addition, although the vehicle 10 shown in FIG. 1 is a parallel-series HEV, the present invention is not limited to HEV's having such a "powersplit" configuration.

A friction braking system is located on vehicle 10, which includes a brake pedal 30, a braking distribution device 32, a brake disc 41, and a brake caliper 43. Upon engagement of the friction braking system via brake pedal 30, the braking distribution device 32 distributes a predetermined amount of braking fluid pressure to each braking caliper 43. In response, the caliper 43 exerts braking forces on brake disc 41, thereby causing vehicle 10 to decrease speed or stop. Alternatively, the friction braking system may be embodied as a brake-by-wire system. In either embodiment, to enable monitoring of braking being applied to wheels 33 and 36, distribution device 32 communicates with a controller 50.

The controller 50 may be a combination vehicle system controller and powertrain control module (VSC/PCM). Although it is shown as a single hardware device, it may include multiple controllers in the form of multiple hardware devices, or multiple software controllers within one or more hardware devices.

A controller area network (CAN) 52 allows the controller 50 to communicate with the transaxle 48. The controller 50 receives signals from the transaxle 48 that indicates whether a transition between shift positions (e.g., from REVERSE shift position to DRIVE shift position or DRIVE shift position to REVERSE shift position) is occurring. Controller 50 also communicates with a battery control module (BCM) 54. Just as the battery 46 has the BCM 54, other devices controlled by the controller 50 may have their own controllers. For example, an engine control unit (ECU) may communicate with the controller 50 and may perform control functions on the engine 12.

In addition, the transaxle 48 may include one or more controllers, such as a transaxle control module (TCM) 56, configured to control specific components within the transaxle 48, such as the generator 14 and/or the motor 40. It is recognized that in some embodiments, the controller 50, the BCM 54, and the TCM 56 may be embodied as a single control device without departing from the scope of the present invention.

The controller 50 has data storage and processing functionality. Particularly, the controller 50 is programmed, through the use of software code, to determine whether a shift position transition will cause noise vibration, and harshness (NVH) anomalies. It is recognized that there are several factors (referred to herein as NVH factors) that indicate that the effects of gear lash are likely or that its effects will be exacerbated. The controller 50 is adapted to process signals relating to these NVH factors and generate control signals that reduce the effects of gear lash.

As described above, one factor that can indicate the possibility of NVH anomalies resulting from gear lash is a shift position transition that causes a change in the direction of driving torque (i.e., DRIVE shift position to REVERSE shift position or REVERSE shift position to DRIVE shift position). Another NVH factor includes whether the vehicle's brakes are being applied. It is recognized that the effects of gear lash may be exacerbated when the brake is applied. An additional NVH factor includes the speed of the vehicle. When the vehicle is traveling at very low speeds (e.g., less than 2 miles per hour) or is stationary, NVH anomalies due to gear lash are more likely. Alternatively, if the vehicle is traveling at higher speeds, gear lash effects are not as noticeable. It is recognized that there may exist other factors that contribute to NVH anomalies. As such, the controller 50 may be programmed to process signals associated with virtually any factor that contributes to the NVH anomalies.

To mitigate the effects of gear lash, the controller 50 is programmed to process signals that correspond to the above NVH factors for controlling the torque generated by the motor 40 and the generator 14. Upon determining that NVH anomalies resulting from gear lash are likely, by processing signals corresponding to the NVH factors, the controller 50 generates signals that cause the application of a "pre-torque" (referred to herein as a predetermined torque) for a predetermined time period. Subsequent to the application of the predetermined torque, the controller 50 generates signals for the motor 40 and the generator 14 to gradually increase the applied torque until the creep torque is reached. The application of the predetermined torque followed by the gradual increase of torque until the creep torque is reached enables a smooth shift position transition.

In one embodiment, the predetermined torque includes the torque generated by the motor 40 and/or generator 14 (hereinafter referred to as motor torque). The predetermined torque as produced by the motor 40 and/or the generator 14 may be in a range of 1.5 Nm to 3.5 Nm, which is about 15 Nm to 35 Nm of torque applied to the wheels (also referred to as wheel torque). Preferably, although not necessarily, the predetermined torque is about 2.5 Nm of motor torque, which is about 25 Nm of torque at the wheels 36. As demonstrated, the predetermined torque is smaller than the creep torque of about 450 Nm as applied to the wheels 36. As described herein, the predetermined torque is set at an amount that is large enough to overcome static friction within the vehicle powertrain but small enough to prevent rapid acceleration of the vehicle's gear set. The predetermined time period during which the predetermined torque will be applied may be in the range of 0.2 seconds to 1.5 seconds. In one embodiment, the predetermined time period is about 0.5 seconds.

It is recognized, however, that the NVH anomalies that result from gear lash may be a function of the specific vehicle configuration, size, weight, and the like. As such, the predetermined torque and the predetermined time period are merely exemplary and may differ in alternative embodiments without departing from the scope of the present invention.

As stated above, subsequent to the application of the predetermined torque for the predetermined time period, the controller 50 is configured to generate signals that cause a gradual ramping up of torque until the creep torque is reached. In one embodiment, the controller 50 generates such signals which are initially received by TCM 56. In response, TCM 56 generates signals that cause the generation of torque by the generator 14 and/or the motor 40.

The application of the predetermined torque followed by the gradual increase in applied torque may occur as provided by a torque map. The torque map, which may be implemented via software code, provides particular torque values and corresponding times by which torque should be generated by the generator 14 and/or the motor 40. As such, the controller 50 may have the torque map stored in memory. An illustration of the torque map is shown in Table 1. Table 1 assumes a creep torque of about 450 Nm.

TABLE 1

| Time since shift position transition (seconds) | 0 | .500 | 1.250 | 2.00 |
|---|---|---|---|---|
| Percentage of Creep Torque | 6% | 6% | 100% | 100% |

As shown, at the time of a shift position transition (i.e., 0 seconds), the applied predetermined torque may be 6% of the creep torque (e.g., 450 Nm). At 0.5 seconds the predetermined torque is maintained at 6% of the creep torque. After 0.5 seconds up to 1.25 seconds, the torque ramps up from the predetermined torque up to 100% of the creep torque. At 2.0 seconds after the shift position transition the creep torque is maintained. It is recognized that the values shown in Table 1 are merely exemplary and may differ from vehicle to vehicle without departing from the scope of the present invention.

Figure 2A:
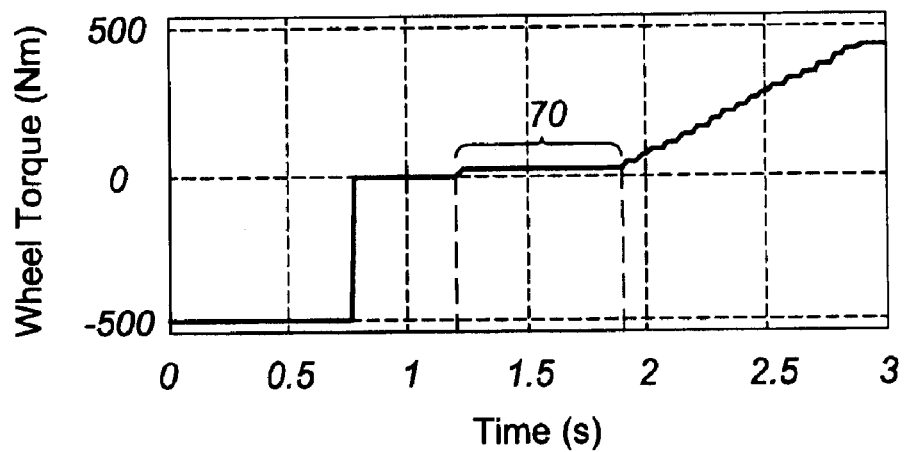
FIGS. 2A-2C are exemplary graphs illustrating, respectively, Wheel Torque versus Time, a selected Shift Position versus Time, and Motor Speed versus Time according to an embodiment of the present invention.
Figure 2B:
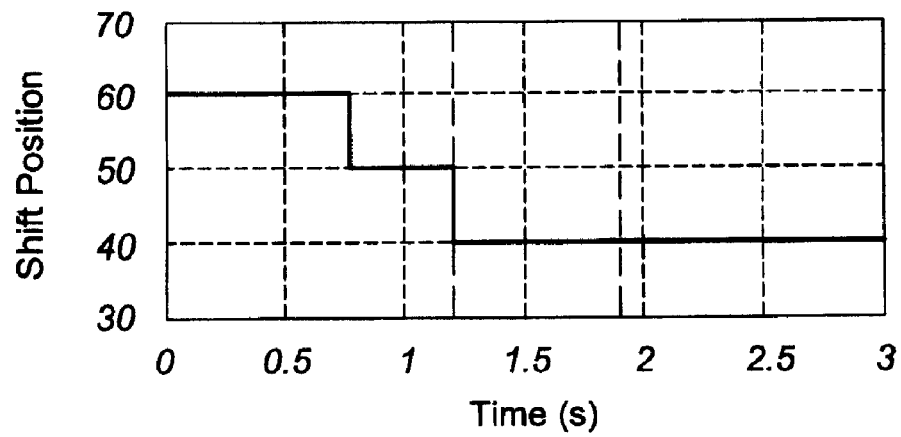
Figure 2C:
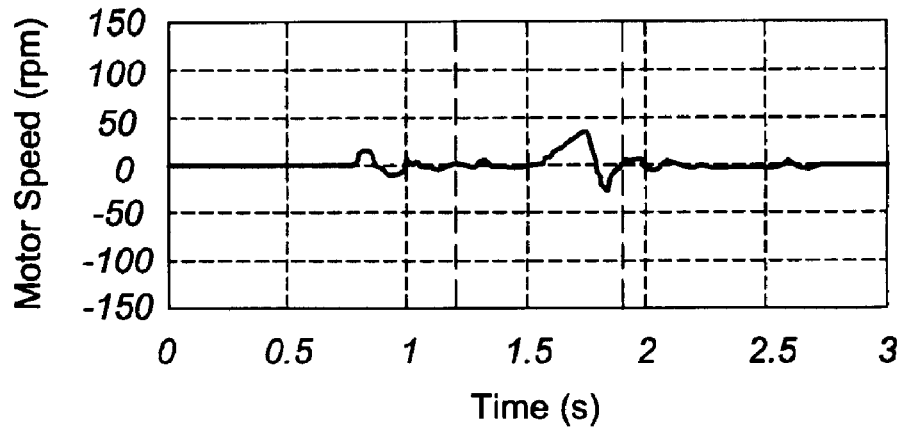

Now, referring to FIGS. 2A-2C, exemplary waveforms for a transition from the REVERSE shift position to the DRIVE shift position are provided. Particularly, FIG. 2A illustrates the applied wheel torque versus time. FIG. 2B illustrates a selected shift position versus time. In FIG. 2B, arbitrary values have been assigned to selectable shift positions. Specifically, the value 60 represents the REVERSE shift position, the value 50 represents a NEUTRAL position, and the value 40 represents the DRIVE shift position. FIG. 2C illustrates the speed of a motor (i.e., motor 40 and/or generator 14) versus time.

In FIGS. 2A-2C, from 0 seconds to approximately 0.75 seconds the vehicle is in the REVERSE shift position, a wheel torque in the REVERSE direction of 500 Nm is applied, and the motor speed is 0 revolutions per minute (rpm). Between 0.75 seconds and 1.25 seconds, a shift position transition occurs from the REVERSE shift position to the NEUTRAL position, then to the DRIVE shift position. As the transition from the REVERSE shift position to the NEUTRAL position occurs, the applied wheel torque in the REVERSE direction is reduced to 0 Nm. Accordingly, the motor speed oscillates plus/minus 20 rpm.

At approximately 1.25 seconds, the gear set transitions into the DRIVE shift position. At this time, as indicated by the bracket 70 in FIG. 2A, the predetermined torque of about 25 Nm is applied to the wheels in the forward direction. In the embodiment shown, the predetermined torque is applied for a predetermined time period of approximately 0.6 seconds. During the predetermined time period, the motor speed has a peak speed of about +40 rpm and oscillates in a range of −35 rpm to +40 rpm (FIG. 2C). Unlike the embodiments described herein, the conventional systems have a peak motor speed of about 135 rpm and the motor speed oscillates in the range of −50 rpm to 135 rpm. Accordingly, with the present invention, the peak motor speed and range of motor speed during a shift position transition is significantly less than conventional systems. The smaller motor speed magnitude and range of motor speed oscillations is an indication that the NVH anomalies due to gear lash have been reduced.

As described above, subsequent to the application of the predetermined torque for the predetermined time period, the controller generates signals that cause a gradual increase in the applied torque until the creep torque is reached. This gradual increase in torque occurs within a predetermined ramp time. In FIG. 2A at approximately 1.9 seconds, the wheel torque is gradually increased from 25 Nm to approximately 450 Nm. As shown, the gradual increase in torque spans about 1.1 seconds. This "ramp time" of 1.1 seconds may vary in alternative embodiments. Particularly, the ramp time for gradually increasing the torque in an amount greater than the predetermined torque up to the creep torque may be in a range of 0.5 seconds to 1.5 seconds. As shown in FIG. 2C, the motor speed stabilizes around 0 rpm. Based on the forgoing description, the span of time for transitioning from a REVERSE creep torque to a DRIVE creep torque is around 2.2 seconds. In prior art systems, the span of time for a change in the direction of applied creep torque is about 0.6 seconds.

Based on the foregoing description, the change in direction of the torque (i.e., creep torque) on the gear set 38 and the differential 15 (FIG. 1) is not as abrupt as compared to prior art systems. Accordingly, due to the application of the predetermined torque followed by the gradual increase in applied torque, the effects of gear lash are reduced. Additionally, although FIGS. 2A-2C illustrate a transition from the REVERSE shift position to the DRIVE shift position, the present invention is equally applicable to other shift position transitions that may cause undesirable NVH anomalies as a result of gear lash.

Figure 3:
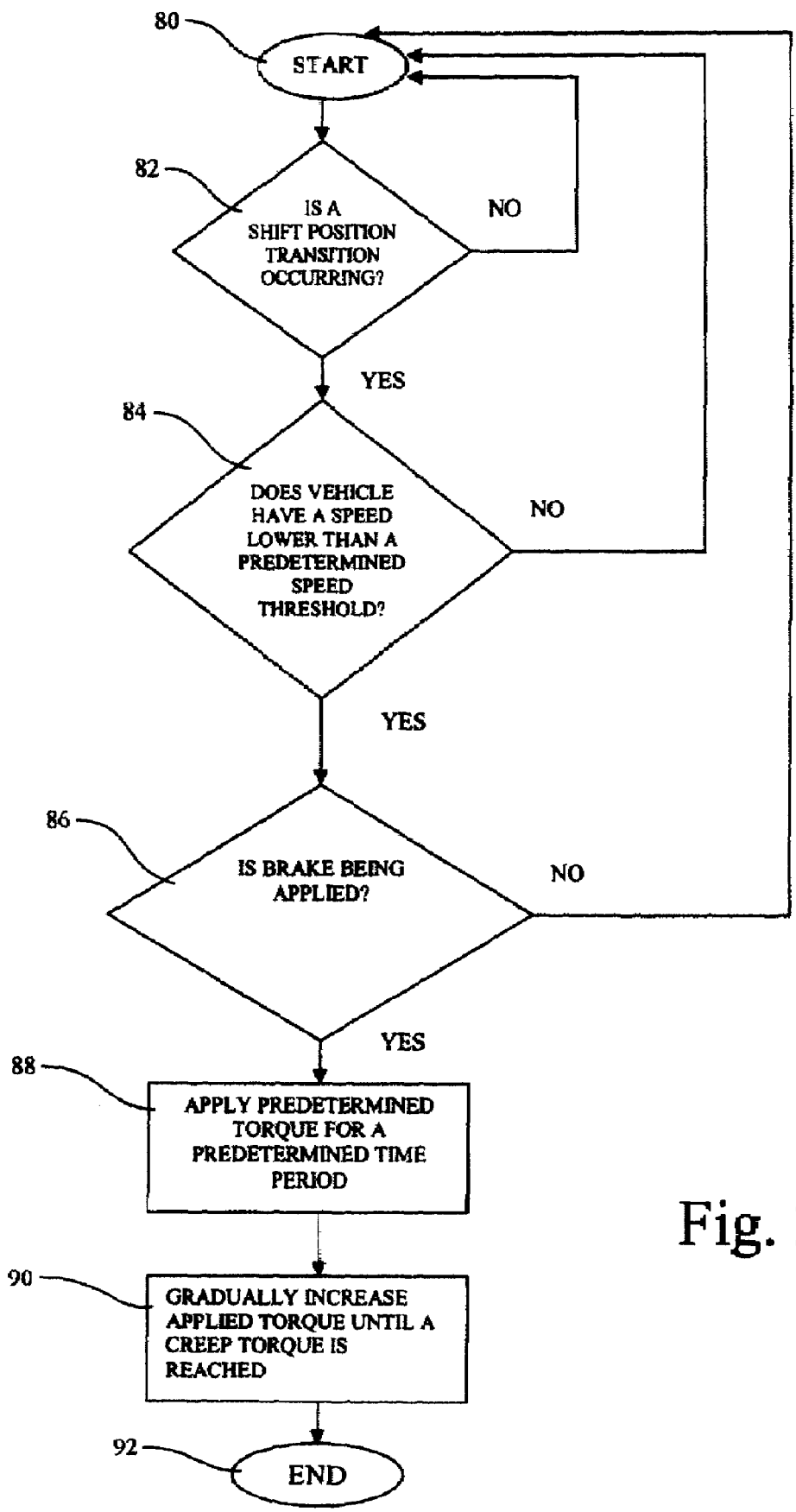
FIG. 3 is a flow chart of a method for controlling a vehicle according to an embodiment of the present invention.

Referring to FIG. 3, a flow chart illustrates a method for reducing the effects of gear lash. A step 80 is the entry point into the method. Block 82 depicts the determination of whether a shift position transition is occurring. As described in the foregoing, shift position transitions including transitions from a REVERSE shift position to the DRIVE shift position or the DRIVE shift position to the REVERSE shift position will likely cause gear lash anomalies. Accordingly, at block 82 if a shift position transition is not occurring, as determined by the vehicle controller, the method returns to the entry point. If a shift position transition is occurring, the block 84 occurs. At block 84, the controller determines whether the vehicle has a speed that is lower than a predetermined speed threshold. If the vehicle does not have a speed lower than the predetermined speed threshold, the method returns to the entry point. However, if it is determined that the vehicle has a speed lower than the predetermined speed threshold, a block 86 occurs. In one embodiment, the predetermined speed threshold is about two miles per hour.

At block 86, the method determines whether the brake is being applied. As described in the foregoing, the effects of gear lash are exacerbated when the vehicle brakes are being applied. As such, if the brake is not applied, the method returns to the entry point. If the brake is being applied, as determined by the controller, a block 88 occurs. It is recognized that although blocks 84 and 86 are illustrated, these blocks are not required in alternative embodiments.

At block 88, the predetermined torque is applied to the vehicle wheels for the predetermined time period. Subsequently, the torque applied to the vehicle wheels is gradually increased until the creep torque is reached as depicted by block 90. Following block 90, the method ends at block 92.

While the best mode for carrying out the invention has been described in detail, those familiar with the art to which this invention relates will recognize various alternative designs and embodiments for practicing the invention as defined by the following claims.

What is claimed:

1. A system comprising:
   a controller operable with a gear set to:
   generate signals for an application of a predetermined torque to the gear set for a fixed predetermined time period upon determining that the gear set is transitioning between a first shift position and a second shift position, and
   generate signals for an increase in torque applied to the gear set in an amount greater than the predetermined torque until a creep torque is reached.

2. The system of claim 1, wherein the increase in torque applied to the gear set in an amount greater than the predetermined torque occurs within a predetermined ramp period.

3. The system of claim 1, wherein the controller generates signals for the application of a predetermined torque when a brake is being applied.

4. The system of claim 1, wherein the first shift position is a REVERSE shift position and the second shift position is a DRIVE shift position.

5. The system of claim 1, further comprising a motor that is coupled to the gear set and in communication with the controller, wherein the controller generates signals for the motor to apply the predetermined torque to the gear set for the predetermined time period in response to the transition between the first shift position and the second shift position.

6. The system of claim 1, wherein the controller generates signals for the application of the predetermined torque when vehicle speed is below a predetermined speed threshold.

7. The system of claim 1, wherein the signals for an increase in torque applied to the gear set in an amount greater than the predetermined torque until a creep torque is reached are generated upon the expiration of the predetermined period.

8. A method comprising:
   generating signals for an application of a predetermined torque to a gear set for a fixed predetermined time period upon determining that the gear set is transitioning between a first shift position and a second shift position; and
   generating signals for an increase in torque applied to the gear set in an amount greater than the predetermined torque until a creep torque is reached.

9. The method of claim 8, wherein the increasing the torque applied to the gear set in an amount greater than the predetermined torque occurs within a predetermined ramp period.

10. The method of claim 8, wherein generating signals for an application of the predetermined torque to the gear set occurs when a brake is engaged.

11. The method of claim 8, wherein the first shift position is a REVERSE shift position and the second shift position is a DRIVE shift position.

12. The method of claim 8, further comprising configuring a motor to be coupled to the gear set and be in communication with a controller, wherein the controller generates signals for the motor to apply the predetermined torque to the gear set for the predetermined time period in response to the transition between the first shift position and the second shift position.

13. The method of claim 8, wherein generating signals for the application of the predetermined torque to the gear set occurs when vehicle speed is below a predetermined speed threshold.

14. The method of claim 8, wherein the signals for an increase in torque applied to the gear set in an amount greater than the predetermined torque until a creep torque is reached are generated upon the expiration of the predetermined period.

15. A method comprising:
    applying a predetermined torque in an amount sufficient to overcome static friction in a vehicle powertrain for a fixed predetermined time period to a gear set through the use of a motor coupled to the gear set when a transition between a reverse shift position and a drive shift position is occurring; and
    increasing the torque applied to the gear set in an amount greater than the predetermined torque up to a creep torque within a predetermined ramp period after the predetermined time period has passed.

16. The method of claim 15, wherein applying a predetermined torque to the gear set through the use of a motor occurs when the vehicle has a speed that is below a predetermined speed threshold.

17. The method of claim 15, wherein the predetermined torque includes a torque range of 1.5 Newton-meters to 3.5 Newton-meters.

18. The method of claim 15, wherein the predetermined time period includes a time period within a range of 0.2 seconds to 1.5 seconds.

19. The method of claim 15, wherein increasing the torque applied to the gear set is controlled by a torque map stored within a memory of a controller, wherein the controller communicates with the motor.

20. The method of claim 15, wherein the predetermined ramp time includes a ramp time within a range of 0.5 seconds to 1.5 seconds.

* * * * *